Nov. 25, 1952 A. THOMAS ET AL 2,619,281

SEQUENTIAL COMPARING MECHANISM FOR STATISTICAL MACHINES

Filed Aug. 4, 1950 4 Sheets-Sheet 1

*Inventors*
ARTHUR THOMAS
NORMAN GEOFFREY HOLDEN
By [signature]
*Attorney*

SEQUENTIAL COMPARING MECHANISM FOR STATISTICAL MACHINES

Filed Aug. 4, 1950 4 Sheets-Sheet 2

*Inventors*
ARTHUR THOMAS
NORMAN GEOFFREY HOLDEN
By [signature]
*Attorney*

SEQUENTIAL COMPARING MECHANISM FOR STATISTICAL MACHINES

Filed Aug. 4, 1950 4 Sheets-Sheet 3

Inventors
ARTHUR THOMAS
NORMAN GEOFFREY HOLDEN
By [signature]
Attorney

SEQUENTIAL COMPARING MECHANISM FOR STATISTICAL MACHINES

Filed Aug. 4, 1950 4 Sheets-Sheet 4

Inventors
ARTHUR THOMAS
NORMAN GEOFFREY HOLDEN
By J. L. Sterling
Attorney

Patented Nov. 25, 1952 2,619,281

UNITED STATES PATENT OFFICE 2,619,281

SEQUENTIAL COMPARING MECHANISM FOR STATISTICAL MACHINES

Arthur Thomas, Wallington, and Norman Geoffrey Holden, Carshalton, England, assignors to Powers-Samas Accounting Machines Limited, London, England, a British company Application August 4, 1950, Serial No. 177,725
In Great Britain August 10, 1949

6 Claims. (Cl. 235—61.7)

This invention is for improvements in or relating to statistical machines and has particular reference to apparatus for comparing numbers.

An apparatus for comparing two numbers as hereinafter described operates in two stages to determine which is the greater whole number and which is the smaller. During the first stage the digits of like denominational value are compared and an indication is given as to which is the digit of greater value of each pair so compared.

During the second stage the indications of denominational superiority obtained during the first stage are explored to ascertain which of the numbers contains the first higher denominational digit, considered from left to right of the numbers i. e. from the highest to the lowest denomination, and resulting from the said exploration an indication is given as to which of the two whole numbers is of the greater numerical value.

According to the invention there is provided apparatus for comparing numbers, comprising two sets of differentially settable denominational number registering elements, a plurality of slides operatively connected with a corresponding registering element in each set for movement thereby according to the sign of the difference between the two corresponding registering elements, indicating devices settable as a result of movement of said slides in accordance with the sign of the difference between the numbers registered by the registering elements, and means responsive to the movement of said slides to determine the setting of said indicating devices.

Each differentially settable denominational number registering element may comprise a reciprocable member differentially settable to represent the digits 0 to 9, the reciprocable members being arranged in pairs parallel one to the other and connected at their adjacent ends to the arms of a pivoted T-shaped member whereby said T-shaped member is rocked to one side or the other of a central position in accordance with the sign of the difference between the two digits registered by the two reciprocable members of a pair.

In one construction according to the invention the indicating devices comprise a pair of vertically reciprocable abutments and means for determining the setting of the abutments comprises for each abutment a set of pivoted toothed plates one associated with each registering element and one for each abutment each said plate being spring urged for angular movement in one direction about its pivot, a release member to retain the toothed plates of each set depressed against the action of their associated springs and operable at predetermined intervals simultaneously to free the plates to the action of said springs, a link connecting each toothed plate with its associated slide, said link being pivoted to the toothed plate for angular movement relative thereto in response to movement of the slide on actuation of the toothed member by its spring, means to connect the links of each set and adapted to interrupt said connection on movement of a slide from the normal or neutral position thereof, and a member movable with each slide to engage the appropriate one of its pair of associated toothed plates and retain the plate depressed against the action of its spring on movement of the slide from said normal or neutral position.

In order that the invention may be more clearly understood an embodiment thereof will now be described by way of example with reference to the accompanying diagrammatic drawings in which.

Figure 3:
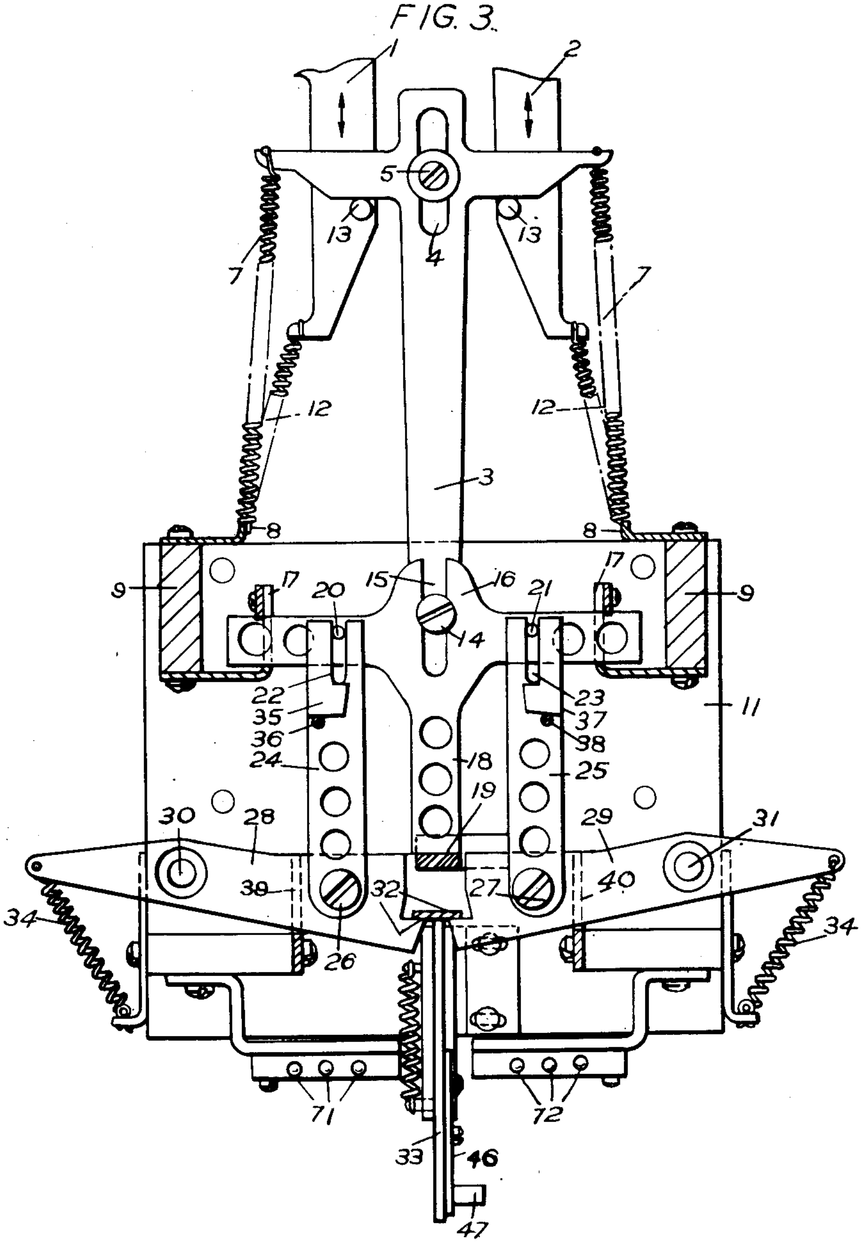
Figure 3 is a section on line III—III of Figure 2 some parts being omitted for clarity, Figure 4 diagrammatically illustrates the operation of links controlling the indicators.

Referring to the drawings Figure 3 shows a pair of differentially settable digit registering elements shown as vertically reciprocable members 1 and 2 which may comprise slides set as described in United Kingdom Patent Specification No. 597,492. The slides are integers of two sets of slides and are set by lengthwise movement, each slide of a pair representing a like denomination. Thus, there is a pair of slides for units, tens, hundreds, thousands and so on.

Each pair of digit registering elements 1 and 2 is associated with a T-shaped member 3 provided with a slot 4 to slide on and turn about a rod 5 fixed to a plate not shown, supported on the machine frame. Springs 7 are attached at one end to each arm of the T-shaped member and at their other ends are anchored two brackets 8 fixed to the top of spacer bars 9 separating the end plates 10 and 11, Figure 2, of the comparing unit. Also anchored to the brackets 8 are further springs 12 acting on the digit registering elements 1 and 2.

Figure 4:
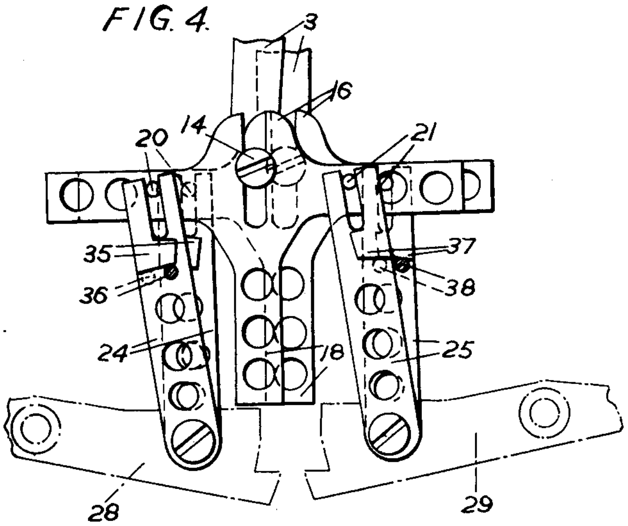
Figure 5:
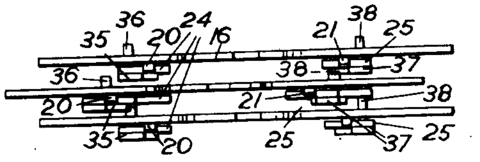
Figure 5 is a plan of a part of Figure 4, Figure 6 diagrammatically illustrates the indicators

The digit registering elements 1 and 2 are each provided with a pin 13 to engage beneath an arm of the T-shaped member 3 associated therewith the arrangement being such that when the digit registering elements are raised to a position of register the pins 13 lift the T-shaped member 3. If the digit registering elements of a pair are lifted to register identical numbers the T-shaped member associated therewith is raised vertically, its arms being maintained in a horizontal position, but should the number registered on one element of the pair be different from that registered by the other element of the pair the element registering the number of greater value will cause the T-shaped member to be turned about the rod 5 because the pin 13 on the element registering the number of greater value will be raised to a greater extent than that of the other element of the pair. The T-shaped member is then therefore, rocked to one side or other of central position as shown in Figure 4 in accordance with the sign of difference between the two digits registered by the digit registering elements 1 and 2.

The lower end of the T-shaped member 3 has a pin 14 secured thereto the shank of the pin being located in a slot 15 in a laterally slidable plate 16, hereinafter referred to as a slide.

The slides 16 are supported by and are slidable laterally in comb members 17 secured to the spacer bars 9. Each slide 16 has a depending member 18 formed integrally therewith to act as a stop as described below, and the free ends of the stops 18 are located in a comb 19, Figure 3, which ensures their lateral movement in a predetermined path.

Two pins 20 and 21 project from the slide 16 and are housed in slots 22, 23, Figure 3, in connector links 24, 25 pivoted respectively at 26 and 27 to toothed plates 28 and 29. The plates 28 and 29 are freely mounted on spindles 30, 31 supported in the end plates 10, 11 and a tooth 32 on each plate is disposed beneath the head of a vertically reciprocable T-shaped release member 33. The plates 28, 29 are normally retained in the position shown in Figure 3 by the head of release member 33 against the action of springs 34.

Each link 24 has a connector plate 35 secured to one side thereof and a pin 36 projecting from its other side. Each link 25 is similarly provided with a connector plate 37 and a pin 38. In the construction shown in the drawings the connector plates 35, 37 associated with the digit registering elements 1, 2 of one denomination are arranged to engage the pins 36, 38 on the links 24, 25 of the next higher denomination and when the slides 16 are all in their normal or neutral positions as shown in Figure 3 the toothed plates 28, 29 are, due to the influence of springs 34, all free to turn about their spindles 30, 31 when the release member 33 is raised. The toothed plates 28, 29 are guided by combs 39, 40.

Figure 1:
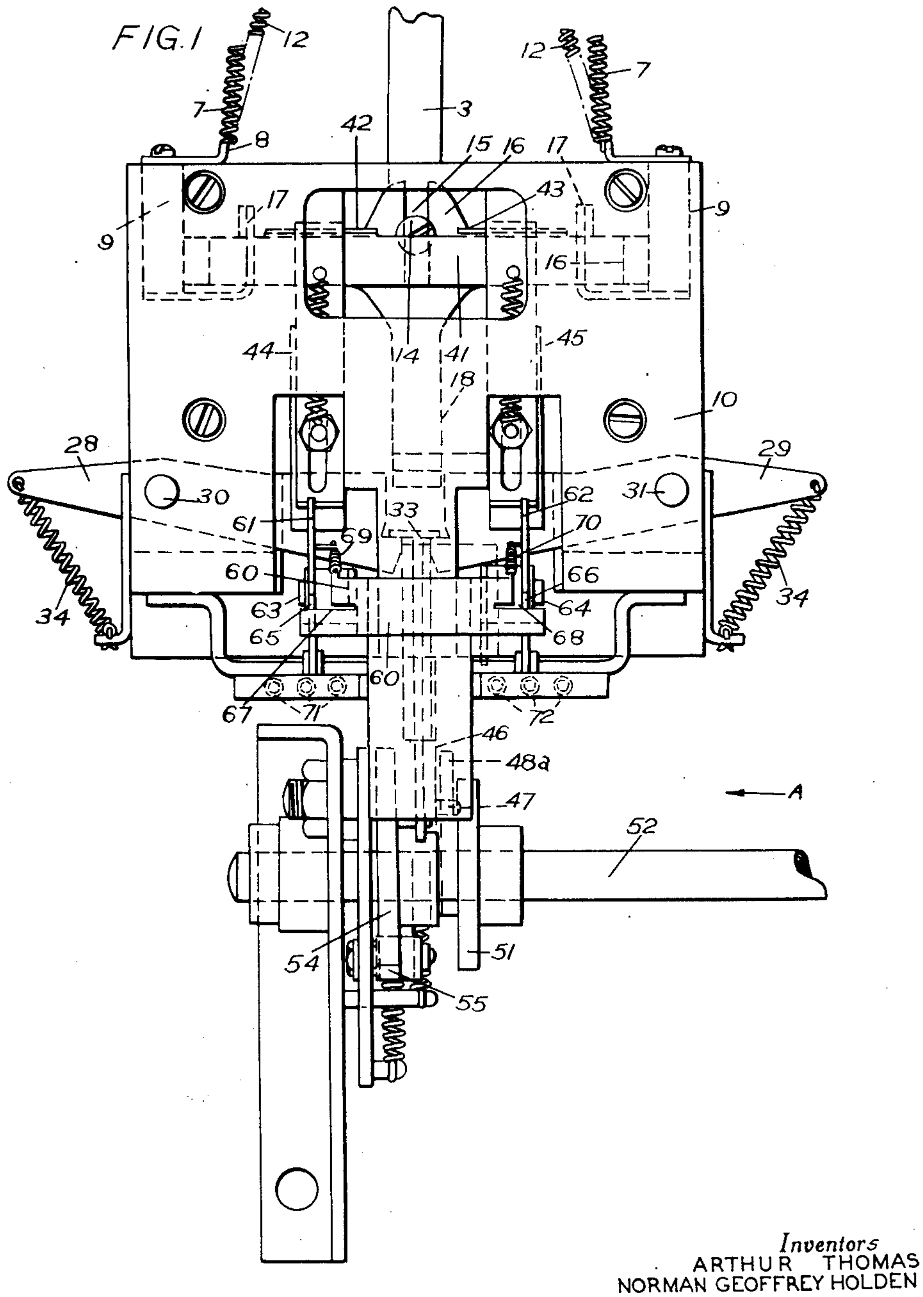
Figure 1 is a front elevation of apparatus according to the invention.
Figure 6:
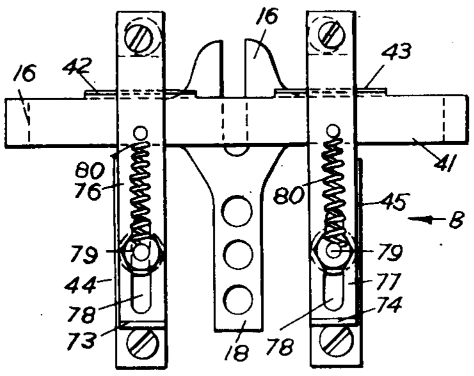
Figure 7:
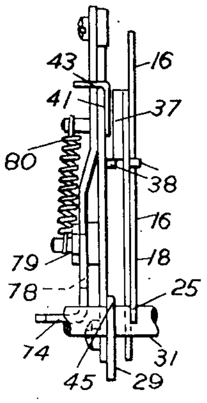
Figure 7 is a side view of Figure 6 looking in the direction of arrow B.

At one end of the unit there is provided a fixed plate 41, Figures 1 and 6, in a position corresponding to that occupied by the slide 16 disposed in a column behind it. Two angle pieces 42, 43 fixed to the top of the fixed plate 41 act as guides for two further links 44, 45, which act as indicating devices to indicate which of the registered numbers is the greater, the links 44, 45 as will be described below, being settable as a result of movement of the slides 16 in accordance with the sign of the difference between the numbers registered by the registering elements 1, 2, the links 44, 45 are also pivotally connected to toothed plates 28, 29, and respectively support abutments 73 and 74, Figure 6.

Figure 2:
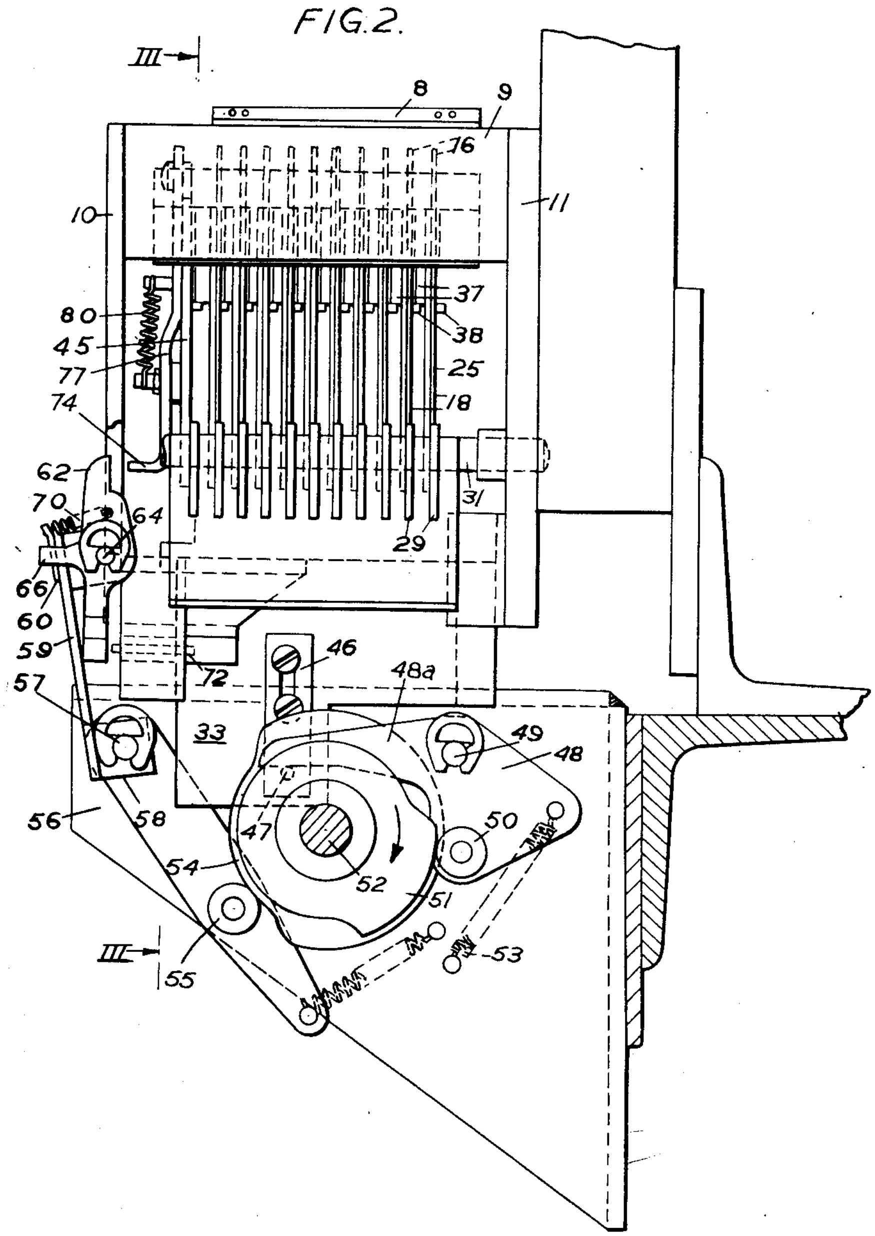
Figure 2 is a side view of Figure 1 looking in the direction of arrow A.

The T-shaped release member 33 has a plate 46 secured thereto and a pin 47 extends outwards from the plate 46 and is engaged by an arm 48*a*, Figure 2, of a bell crank 48 pivoted at 49 to the machine frame. The other arm of the bell crank carries a roller 50 retained by a spring 53, in engagement with a cam 51 on a shaft 52. The shaft 52 is driven from the main drive of the machine, by means not shown, and the release member 33 is, therefore, positively actuated in timed relation with the setting of the digit registering elements 1 and 2.

Also mounted on the shaft 52 is a second cam 54 acting on a roller 55 carried on an arm 56 pivotally mounted on a stub shaft 57. Secured to said arm 56 and also mounted on the stub shaft is a block 58 carrying an arm 59 to the upper end of which is secured a cross piece 60. The arm 59 acts as a carriage for two actuator members 61 and 62 which are pivoted at 63 and 64 respectively to a block secured to the upper end of the arm 59. The actuator members 61 and 62 are provided with tails 65, 66 normally retained by springs 69, 70 against stops formed by faces 67 and 68, Figure 1, on the cross piece 60. The actuator members are moved towards and away from the ends of plungers 71 and 72 associated with two sets of Bowden wires adapted to control machine functions as a result of the operation of the comparing unit.

The timing of the apparatus is such that the release member 33 is moved to its uppermost position before the arm 59 is moved to the right of Figure 2.

If during the first stage of the comparing operation the digit registering elements 1 and 2 have been moved by equal distances, thus indicating equality between the two numbers being compared, none of the slides 16 will have been moved laterally and the abutments 73 and 74 will both be free to rise when the release member 33 is raised. In these circumstances when the arm 59 is moved to the right as viewed in Figure 2 the pivots 63 and 64 move with it and the lower ends of the actuator members 61, 62 bear lightly against the ends of the plungers 71 and 72 while the upper ends of the actuator members rotating clockwise about their pivots 63, 64 against the action of springs 69 and 70, pass beneath the raised abutments 73 and 74.

If, however, as the result of the first stage of the comparing operation a slide 16 has been moved laterally, the appropriate one of the abutments 73, 74 will be located in the path of its associated actuator member 61 or 62 so that on movement of the arm 59 to the right as viewed in Figure 2, the actuator member will be engaged by the abutment disposed in its path and continued forward movement of the arm 59 will cause the actuator member so engaged to rock counter-clockwise about its pivot and the lower end of the actuator member actuates the Bowden wires associated therewith.

As a safety precaution against jamming the abutments 73, 74 are mounted on plates 76, 77 fitted to the links 44, 45. A lost motion connection comprising a slot 78, pin 79 and spring 80 is provided between the plates 44 and 76, and 45 and 77 respectively so that should an actuator be disposed beneath an abutment 73 or 74 when it is lowered the abutment will move relatively to the link 44 or 45 with which it is associated thus preventing jamming.

In order that the second stage of the comparing operation may be fully understood, let it now be assumed that one of the slides 16 has been moved to the left of the neutral position, as shown in Figure 4, indicating that the number registered by the digit registering element 1 is of greater value than that registered by the element 2 of the pair. The connector plate 37 on link 25 is moved to the left as seen in Figure 4 and out of engagement with the pin 38 on the link next to the left thereof, as viewed in Figure 2, this pin being indicated in section in Figure 4, but the pin 38 on the angularly moved link remains in engagement with its associated connector plate 37. The connection between the links 25 and 45 is therefore interrupted but on operation of the release member 33 none of the toothed plates 29 is impeded and each of the plates 29 together with the links 25 and 45 is raised. Thus, the abutment 74 is raised out of the path of the actuator 62 and, on operation of the arm 59, the actuator 62 does not operate the plungers 72.

The leftwise lateral movement of the slide 16 causes the bottom edge of its depending member or stop 18 to slide over the upper edge of its associated tooth plate 28. The connector plate 35 moves counter-clockwise with the link 24 but is not moved out of engagement with the pin 36 on the next link 24 nearer to the left thereof, as viewed in Figure 2, this pin being also indicated in section in Figure 4. The pin 36, shown dotted in Figure 4, on the angularly moved link 24 is, however, moved with the link and disengages the connector plate 35 on the link 24 with which it co-operates.

Thus, when the release member 33 is raised the toothed plates 28 between the angularly moved link 24 and the link 44 and including the link 44 are prevented from rising because the stop 18 retains its associated toothed plate 28 in the lower position and the other links 24 and plates 28 are prevented from rising because of the engagement with the pins 36 and connector plates 35 associated therewith. The links 24 and plates 28 on the other side of the angularly moved link 24 are free to rise when released by the member 33 because the pin 36, shown dotted in Figure 4, on the angularly moved link 24 underlies and therefore is ineffective, in either position thereof for blocking the releasing movement of its associated connector plate 35.

As the link 44 is prevented from rising on operation of the release member 33 the abutment 73 remains in its lower position so that when the actuator member 61 is moved forward by the arm 59 it engages the abutment 73 and is rocked thereby about the pivot 63 so that the plungers 71 associated therewith are actuated as described above.

In the operation just described it was for simplicity assumed that only one of the slides 16 was moved from the neutral position. In practice, however, several of the slides may be moved from the neutral position some to the left, as viewed in Figure 4, and some to the right, the direction being determined by the digit registering element of a pair which registers the denominational digit of greater value. In such circumstances some of the toothed plates 28 and some of the plates 29 will be retained in their lower positions by the stops 18 of the slides 16 but the toothed plate 28 or 29 which is nearest its associated link 44 or 45 and which is restrained by a stop 18 will determine which of the links 44 or 45 remains in its lower position so that the abutment carried thereby is engaged by its associated actuator member to effect operation of the Bowden wires associated therewith.

As an example of the operation of the number comparing apparatus above described let it be assumed that the number 999731 is to be compared with 989972. The number 999731 is set up in the set of digit registering elements comprising the vertically reciprocable elements 1 and the number 989972 is set up in the set comprising the elements 2. The setting up of the elements 1 and 2 constitutes the first stage of the comparing operation in that as the elements 1 and 2 are set up they operate, in the event that there is a difference in numerical value between the two digits of the same denominational order, to determine which of the digits is the greater and to give an indication thereof.

In the example being considered, the digits in the hundreds of thousands denomination are both nines and the elements 1, 2 by which these digits are registered are moved by equal distances so that the T-shaped member 3 connected therewith is not rocked about the pivot 5 and the slide 16 associated therewith remains in the neutral position shown in Figure 3.

In the tens of thousands columns, however, the digit nine registered by the element 1 is of greater numerical value than the digit eight registered by the element 2 and the slide 16 associated therewith is moved to the left, as viewed in Figure 3.

In the thousands columns there is again equality and no lateral movement of the associated slide 16 but in the hundreds columns, the tens columns, and the units denominational columns, the digits registered by the elements 2 are each of greater value than those registered by the elements 1. Consequently, the slides 16 associated with these columns are moved laterally to the right, as viewed in Figure 3. Thus in the first stage of the comparing operation an indication, by means of the slide 16, has been made as to the precedence of the digits in the columns of the same denomination.

During the second stage of the comparing operation when the release member 33 is raised, as previously described, to permit the exploration of the whole numbers for the purpose of determining which is of greater numerical value, the slide 16 associated with the tens of thousands column is in the position shown in Figure 4 as being moved to the left of its neutral position, and being the laterally moved slide nearest to the fixed plate 41 controls the movement of the abutments 73, 74, with the result that the abutment 74 is raised out of the path of the actuator member 62, as described above, the abutment 73 remaining in the path of the actuator member 61 so that the actuator member 61 is caused to operate the set of plungers 71. Thus during the second stage of the comparing operation the laterally moved slide 16 nearest the fixed plate 41 has determined the whole number of greater numerical value and has given an indication thereof through the link 44 and abutment 73 carried thereby.

As a further example of the operation of the apparatus let it be assumed that the number 666499 is to be compared with 666500. During the first stage of the comparing operation the numbers are set up in the sets of digits registering elements 1 and 2 as previously described, and as there is equality between the digits in the hundreds of thousands, tens of thousands, and thousands denominational columns there is no lateral movement of the slides 16 associated with the pairs of elements 1, 2 registering the digits in these denominational columns.

In the hundreds column the digit five registered by the element 2 is greater than the digit four registered by the element 1 so the slide 16 associated therewith is moved to the right as viewed in Figure 3.

In the tens and units columns the digits registered by the elements 1 are each greater than the digits registered by the elements 2. Accordingly the slides 16 associated therewith are moved to the left as viewed in Figure 3.

During the second stage of the comparing operation, when the release member 33 is raised, the slide associated with the hundreds column is the laterally moved slide nearest to the fixed plate 41 and controls the movement of the abutments with the result that, in this instance, the abutment 73 is raised and the abutment 74 remains in the path of its actuator member 62 so that the set of plungers 72 is operated.

From the foregoing, it will be clear that the comparing operation is effected in two stages and it will be understood that the greater whole number is always determined by the lateral movement of the slide 16 associated with the pair of elements 1, 2 representing digits of the highest denominational order in which, during the first stage of the comparing operation, there is found to be a difference between the digits registered and that the selection of the greater whole number during the second stage is unaffected by the lateral movement of any slide 16 associated with elements 1, 2 representing digits of a denominational order lower than that in which such difference in the higher denomination is determined during the first stage.

We claim:

1. Apparatus for comparing numbers, comprising two sets of differentially settable denominational number registering elements, a plurality of slides each operatively connected with a corresponding registering element in each set for movement thereby according to the sign of the difference between the two corresponding registering elements, indicating devices including one for each set of registering elements and selectively settable as a result of movement of said slides in accordance with the sign of the difference between the numbers registered by the registering elements, and means responsive to the movement of said slides to determine the setting of said indicating devices, said means including for each indicating device a separate series of normally effective interconnections carried by said slides and disposed between each indicating device and each of said slides, the separate connections relating to each slide being separately settable depending upon the direction of movement of the related slide, whereby said indicating devices are set in accordance with the position of the slide nearest thereto.

2. Apparatus according to claim 1, wherein each differentially settable denominational number registering element comprises a reciprocable member differentially settable to represent the digits 0 to 9, the reciprocable members being arranged in pairs parallel one to the other and connected at their adjacent ends to the arms of a pivoted T-shaped member whereby said T-shaped member is rocked to one side or the other of a central position in accordance with the sign of the difference between the two digits registered by the two reciprocable members of a pair.

3. Apparatus according to claim 1, wherein the indicating devices comprise a pair of vertically shiftable abutments and the means for determining the setting of the abutments comprises for each abutment a set of pivoted toothed plates, one associated with each registering element and one for each abutment, each said plate being spring-urged for angular movement in one direction about its pivot, a release member to retain the toothed plates of each set depressed against the action of their associated springs and operable at predetermined intervals simultaneously to free the plates to the action of said springs, and a link connecting each toothed plate with its associated slide, said link being pivoted to the toothed plate for angular movement relative thereto in response to the movement of the slide and adapted for movement relative to the slide on actuation of the toothed member by its spring.

4. Apparatus according to claim 3, wherein the interconnections comprise a pin extending from one side of each link to be engaged by a connector plate on the next adjacent link of the set whereby angular movement of a pair of related links about their pivot causes connection between one link of the pair and the next adjacent link on one side thereof to be interrupted while maintaining connection between the other link of the pair and the next adjacent link thereto.

5. Apparatus according to claim 1, wherein actuator members are provided to co-operate with the indicating devices and effect selective actuation of elements for controlling predetermined functions of a statistical machine.

6. Apparatus according to claim 5, wherein the actuator members are pivoted on a carriage mounted for movement towards and away from the abutments, the actuator members being mounted on said carriage for yieldingly engaging the associated elements and each provided with an extending portion for engagement with its associated abutment when said abutment is located in the path thereof during movement of the carriage towards the abutment whereby continued movement of the carriage in said direction after the extending portion has engaged the abutment causes angular movement of the actuator member about its pivot and causes actuation of said elements.

ARTHUR THOMAS.
NORMAN GEOFFREY HOLDEN.

REFERENCES CITED

The following references are of record in the file of this patent:

UNITED STATES PATENTS

| Number | Name | Date |
|---|---|---|
| 2,364,202 | Ford | Dec. 5, 1944 |